US009665766B2

(12) United States Patent
Musial et al.

(10) Patent No.: US 9,665,766 B2
(45) Date of Patent: *May 30, 2017

(54) FACIAL RECOGNITION WITH BIOMETRIC PRE-FILTERS

(71) Applicant: International Business Machines Corporation, Armonk, NY (US)

(72) Inventors: Pawel G. Musial, Tucson, AZ (US); William J. Oliver, Tucson, AZ (US); Wojciech J. Wyzga, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 14/554,093

(22) Filed: Nov. 26, 2014

(65) Prior Publication Data

US 2015/0294136 A1    Oct. 15, 2015

Related U.S. Application Data

(63) Continuation of application No. 14/252,003, filed on Apr. 14, 2014.

(51) Int. Cl.
*G06K 9/00* (2006.01)
*G06K 9/52* (2006.01)
*G06T 7/60* (2006.01)

(52) U.S. Cl.
CPC ....... *G06K 9/00288* (2013.01); *G06K 9/0061* (2013.01); *G06K 9/00248* (2013.01);
(Continued)

(58) Field of Classification Search
CPC ........... G06K 9/00228; G06K 9/00597; G06K 9/00248; G06K 9/00281; G06K 9/0061;
(Continued)

(56) References Cited

U.S. PATENT DOCUMENTS 5,835,616 A * 11/1998 Lobo .................. G06K 9/00221
                                                  382/115
6,698,653 B1 * 3/2004 Diamond ........... G07C 9/00087
                                                  235/375

(Continued)

FOREIGN PATENT DOCUMENTS

WO    2008107713 A1    9/2008
WO    2012076642 A1    6/2012

OTHER PUBLICATIONS

Appendix P List of IBM Patents or Patent Applications Treated as Related.

(Continued)

*Primary Examiner* — Jon Chang
(74) *Attorney, Agent, or Firm* — Isaac J. Gooshaw

(57) ABSTRACT

Embodiments of the present invention disclose a method for facial recognition processing using biometric pre-filters. The computer determines a first eye-to-eye distance of a first detected face of a first image, and wherein the eye-to-eye distance is a biometric measurement. The computer receives a selection of a demographic characteristic. The computer determines a search range for the first eye-to-eye distance based, at least in part, on the selection of the demographic characteristic, and the first eye-to-eye distance. The computer identifies a second image from a plurality of images, wherein the second image includes a second eye-to-eye distance that is included in the determined search range for the first eye-to-eye distance. The computer applies a facial recognition algorithm to the second image to determine at least one potential identity that is associated with the first detected face.

6 Claims, 5 Drawing Sheets

(52) U.S. Cl.
CPC .......... *G06K 9/00281* (2013.01); *G06K 9/52* (2013.01); *G06T 7/60* (2013.01); *G06T 2207/30201* (2013.01)

(58) Field of Classification Search
CPC ........ G06K 9/52; G06K 9/00288; G06T 7/60; G06T 2207/30201
USPC .......................................................... 382/118
See application file for complete search history.

(56) References Cited

U.S. PATENT DOCUMENTS

| | | | | |
|---|---|---|---|---|
| 2003/0235335 | A1* | 12/2003 | Yukhin | G06K 9/00201 382/190 |
| 2008/0044063 | A1* | 2/2008 | Friedman | A61B 3/1216 382/117 |
| 2008/0080745 | A1* | 4/2008 | Vanhoucke | G06F 17/30253 382/118 |
| 2009/0179914 | A1 | 7/2009 | Dahlke | |
| 2010/0253806 | A1* | 10/2010 | Guan | G06K 9/00281 348/231.3 |
| 2010/0312734 | A1* | 12/2010 | Widrow | G06N 3/02 706/25 |
| 2012/0250950 | A1 | 10/2012 | Papakipos et al. | |
| 2012/0293642 | A1 | 11/2012 | Berini et al. | |

OTHER PUBLICATIONS

Bonaiuto et al., "The Use of Attention and Spatial Information for Rapid Facial Recognition in Video", pp. 1-9, 2006.

Dodgson, "Variation and extrema of human interpupillary distance", pp. 36-46 in Proc. SPIE vol. 5291, Stereoscopic Displays and Virtual Reality Systems XI, A. J. Woods, J. O. Merritt, S. A. Benton and M. T. Bolas (eds.), Jan. 19-22, 2004, San Jose, California, USA, ISSN 0277-786X, Copyright 2004 SPIE and IS&T. This paper is published in Proc. SPIE vol. 5291.

Gan, et al., "A Method for Improved PCA in Face Recognition", pp. 79-85, International Journal of Information Technology, vol. 11 No. 11 2005.

Liao, "Partial Face Recognition: Alignment-Free Approach", pp. 1193-1205., Digital Object Identifier No. 10.1109/TPAMI.2012. 191, IEEE Transactions on Pattern Analysis and Machine Intelligence, vol. 35, No. 5, May 2013, 0162-8828/13, Copyright 2013 IEEE.

Starovoitov et al., "Three Approaches for Face Recognition", The 6-th International Conference on Pattern Recognition and Image Analysis, Oct. 21-26, 2002, Velikiy Novgorod, Russia, pp. 707-711.

Sung et al., "Real-time facial expression recognition using STAAM and layered GDA classifier", Image and Vision Computing 27 (2009) 1313-1325, Copyright 2008 Elsevier B.V., doi:10.1016/j. imavis.2008.11.010.

Xiao et al., "Robust Multi-Pose Face Detection in Images", Jan. 2004.

Zhao et al., "Facial Expression Recognition Based on Improved United Model", vol. 36 No. 6, Computer Engineering, Mar. 2010, Copyright 1994-2012 China Academic Journal Electronic Publishing House.

"Facial recognition system", Wikipedia, the free encyclopedia, page last modified on Jan. 22, 2014 at 03:19, <https://en.wikipedia.org/wiki/Facial_recognition_system>.

"System and Method of Multi-person 3D Multi-angel Fast Face Recognition", IP.com No. IPCOM000203089D, IP.corn Electronic Publication: Jan. 19, 2011, pp. 1-22, <http://ip.com/IPCOM1000203089>.

"System and Apparatus of Multi-person Screen Sharing Based on 3D Multi-person Multi-angel Fast Face Recognition Algorithm", pp. 1-33, IP.com No. IPCOM000203470D, IP.com Electronic Publication: Jan. 26, 2011, <http://ip.com/IPCOM/000203470>.

U.S. Appl. No. 14/252,003, entitled "Facial Recognition With Biometric Pre-Filters", filed Apr. 14, 2014.

* cited by examiner

FACIAL RECOGNITION WITH BIOMETRIC PRE-FILTERS

BACKGROUND

The present invention relates generally to the field of facial recognition, and more particularly to improving a facial recognition system using biometric pre-filters.

Facial recognition systems are computer applications used for identifying an unknown person, or verifying the identity of a known person for access control. Facial recognition systems may be used at law enforcement agencies to identify suspects, at border crossings and airports to verify individuals against their passports, at airports to identify wanted individuals, and at casinos to catch blacklisted card counters. Tablets and laptop computers also use face recognition to allow the owner to login by face instead of typing a password. Many of the current digital cameras have a form of face detection which tells the camera what to focus on, and when to take the picture based on smile detection.

While fingerprints have been used by law enforcement for identifying suspects for many years, facial recognition systems offer automated help in identifying potential suspects even when the suspect person is uncooperative. Getting fingerprints from an uncooperative person is a lot harder than snapping a photo of them. While facial recognition may be a slow process, if the detective doesn't have a fingerprint or DNA to help with identification, then facial recognition is the next best thing. Facial recognition systems are useful in law enforcement investigations where a detective might have a picture of a suspect, and needs to determine the identity of the person in the picture.

After inputting a probe image into a facial recognition system, the first step is detecting the face apart from the background, or face localization. The next step is to extract the facial features in the photo to be employed by the facial recognition algorithm. Recognition algorithms can be divided into two main approaches, geometric or photometric. Geometric algorithms look at distinguishing facial features in feature analysis. Such facial recognition algorithms identify faces by extracting features from an image of a subject's face. Photometric algorithms, such as principal component analysis, use a statistical approach by distilling an image into values and comparing the values with templates to eliminate variances. Photometric algorithms normalize a gallery of face images, compress the data, and save only the data in the image used for facial recognition.

SUMMARY

Embodiments of the present invention disclose a method, computer program product, and system for facial recognition processing using biometric pre-filters. The computer determines a first eye-to-eye distance of a first detected face of a first image, wherein the first detected face includes two eyes, and wherein the eye-to-eye distance is a biometric measurement taken from a center of a first eye to a center of a second eye of the first detected face. The computer receives a selection of a demographic characteristic. The computer determines a search range for the first eye-to-eye distance based, at least in part, on the selection of the demographic characteristic, and the first eye-to-eye distance, and wherein the determined search range is a numeric value. The computer identifies a second image from a plurality of images, wherein the second image includes a second detected face that includes a second eye-to-eye distance that is included in the determined search range for the first eye-to-eye distance. The computer applies a facial recognition algorithm to the second image to determine at least one potential identity that is associated with the first detected face.

DETAILED DESCRIPTION

Embodiments of the present invention recognize that existing facial recognition systems compare a probe image to a collection of candidate images or known faces and algorithmically determine if there is a match. A facial recognition algorithm comparing the probe image to each candidate image is processor intensive, involving floating-point and graphical computations to determine image and facial similarities.

Embodiments of the present invention provide for a method, computer program product, and system for optimizing facial recognition analysis using biometric pre-filters. A facial recognition system may apply one or more biometric pre-filters, such as eye-to-eye distance, mid-eye to nose-tip distance, the ratio of eye-to-eye distance to mid-eye to nose-tip distance, or a geometric face shape, to a collection of pre-measured candidate images based on the biometric measurements of a probe image with a defined bounding range. The range may be determined based, at least in part, on selections of demographic characteristics of the subject in the probe image. A facial search application stores the results of the biometric measurements as individual data fields in a facial database, separate from the metadata of the facial image, to be used as pre-filters to reduce the number of candidate images in a facial database processed by a facial recognition system using a facial recognition algorithm when matching a probe image. By using pre-filters to reduce the number of candidate images to which the probe image is compared using a facial recognition algorithm, the time a computer takes to search through millions of candidate images is reduced without affecting the quality of the matching results. Implementation of embodiments of the invention may take a variety of forms, and exemplary implementation details are discussed subsequently with reference to the figures.

Figure 1:
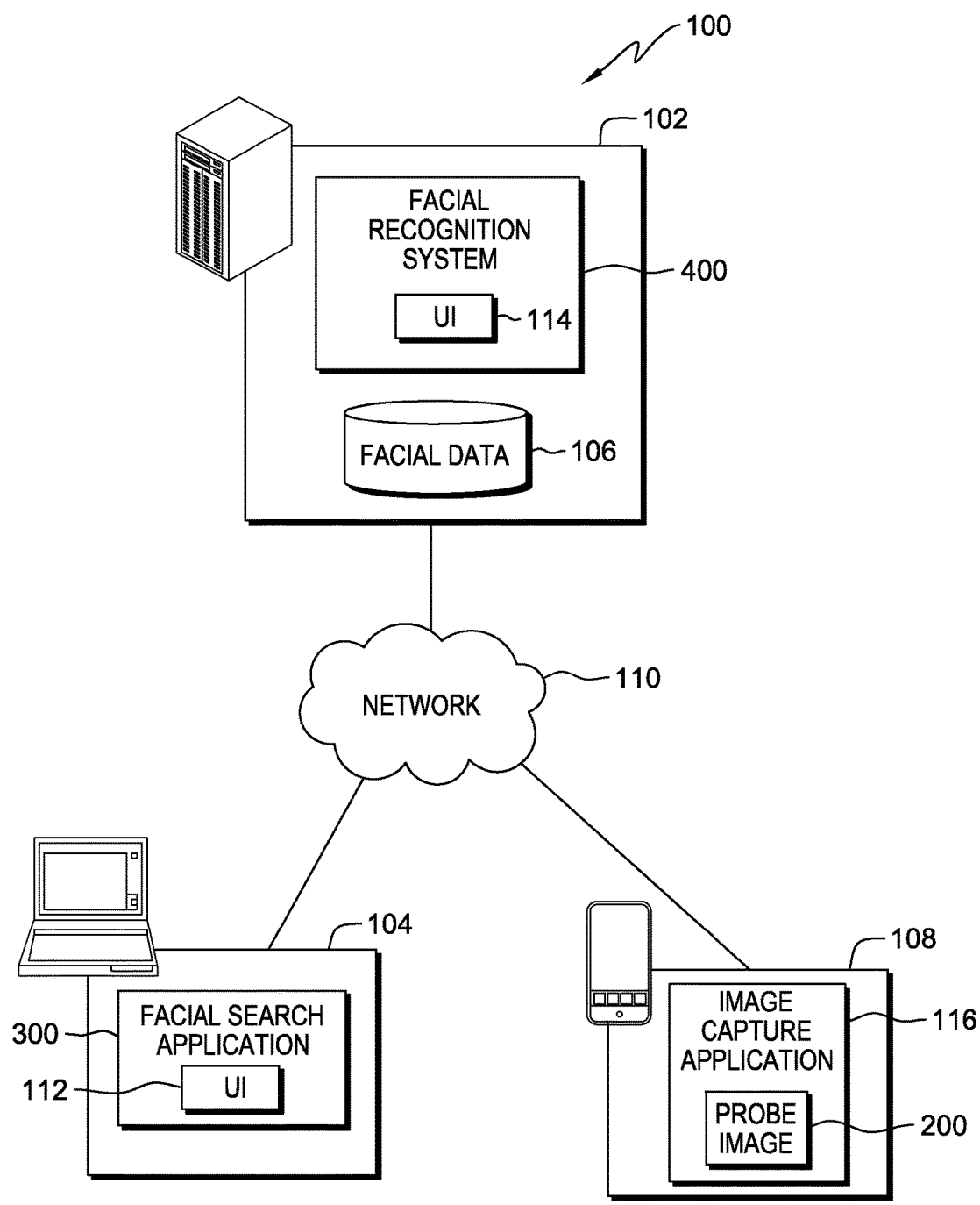
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. Distributed data processing environment 100 includes server computer 102, client computer 104, and client device 108, interconnected over network 110. Distributed data processing environment 100 may include additional server computers, client computers, or other devices not shown.

Network 110 can be, for example, a local area network (LAN), a wide area network (WAN) such as the Internet, or a combination of the two, and can include wired, wireless, fiber optic, or any other connection known in the art. In general, network 110 can be any combination of connections and protocols that may support communications between server computer 102, client computer 104, and client device 108, in accordance with an embodiment of the present invention.

Server computer 102 can be a server computer, an application server, a laptop computer, a tablet computer, a netbook computer, a personal computer (PC), a desktop computer, a personal digital assistant (PDA), a smart phone, or any programmable electronic device capable of communicating with client computer 104, via network 110. In certain embodiments, server computer 102 represents a computer system utilizing clustered computers and components that act as a single pool of seamless resources when accessed through network 110, as is common in data centers and with cloud computing applications. Server computer 102 may be a node in a distributed database management environment. In general, server computer 102 can be representative of any computing device or a combination of devices with access to facial recognition system 400, and facial data 106, and is capable of executing facial recognition system 400. Server computer 102 may include internal and external hardware components, as depicted and described in further detail with respect to FIG. 5.

Server computer 102 includes an instance of facial recognition system 400. In the depicted environment, facial recognition system 400 may be a suite of facial recognition applications with capabilities including, but not limited to, detecting faces within digital images, detecting facial features, enrolling new images into facial data 106, calculating biometric measurements of facial features in an image, comparing a probe image to a collection of images in facial data 106, and finding ranked matches for the probe image. Facial recognition system 400 may provide application programming interfaces (API) that enable applications to connect to data repositories, such as facial data 106, and issue commands for manipulating data repositories. In the depicted environment, facial recognition system 400 uses a user interface, such as UI 114, to receive user input, and to output responses to a user. In other embodiments, facial recognition system 400 and facial data 106 may be on one computer, or more than one computer, and each item may be split into a plurality of parts or modules and spread across more than one computer. In any configuration, the following is maintained: facial recognition system 400 communicates with facial data 106. Facial recognition system 400 is described further in FIG. 4.

Server computer 102 includes a user interface, such as UI 114, which executes locally on the server computer. UI 114 may utilize a web page application, a command line processor, or any other graphical user interface (GUI). UI 114 includes components used to receive input from a user and transmit the input to facial recognition system 400 residing on server computer 102. In an embodiment, UI 114 uses a combination of technologies and devices, such as device drivers, to provide a platform to enable users of server computer 102 to interact with facial recognition system 400. In an embodiment, UI 114 receives input, such as selections of radio buttons or check boxes using a physical input device, such as a keyboard or mouse, via a device driver that corresponds to the physical input device.

Server computer 102 includes an instance of facial data 106. Facial data 106 is a repository or database for the storage of candidate images including, but not limited to, a digital image of a face or a link to the image file, personal information about the subject such as name, measurements of facial features taken from the image and encoded in some form, demographic characteristics, and biometric measurements to be used in pre-filtering. The digital image may include, but is not limited to, a scan of an artist sketch, a still from a video image, a scan of a printed photo, and an image from a digital camera or smart phone. Facial encoded data for an image may be stored as metadata in one large data field of a database table in facial data 106. The metadata may be in a proprietary format specific to the facial recognition algorithm being used by facial recognition system 400. A link to the actual digital image file may be included as a separate data field in the database. Embodiments of the present invention provide for separate searchable data fields in the database related to one or more biometric measurements, such as the eye-to-eye distance, the ratio of eye-to-eye distance over mid-eye to nose-tip distance, or the geometric shape of a triangle between the eyes and the midpoint of the nose. The separate data fields may be stored in the database of facial data 106 in the form of an index to allow for quick searching by facial recognition system 400.

In some embodiments, facial data 106 may be a new database created and used by facial recognition system 400 where selected biometric measurements, such as eye-to-eye distance, are calculated for new candidate images, and then stored as separate data fields in facial data 106. Facial recognition system 400 may be configured to calculate biometric measurements based on face detection, and lens and distance calculations, and may store the results within the image metadata. In other embodiments, facial data 106 may include candidate images from pre-existing facial recognition databases. In the case of pre-existing candidate images without lens and distance information in the photo metadata, facial recognition system 400 may calculate the biometric measurements by generating a 3D model of the face using the pixel width of the eyes as a standard, modeling the rest of the facial features in proportion, and calculating the biometric measurements. Using the 3D model method is less accurate than using lens and distance calculations, and may be included as a factor when setting the range of biometric measurements used in searches.

Facial data 106 may be implemented within any type of storage device, for example, persistent storage 508 as depicted and described with reference to FIG. 5, which is capable of storing data that may be accessed and utilized by server computer 102, such as a database server, a hard disk drive, or flash memory. In other embodiments, facial data 106 can represent multiple storage devices within server computer 102.

In various embodiments of the present invention, client computer 104 can be a laptop computer, a tablet computer, an application server, a netbook computer, a personal computer (PC), a desktop computer, a personal digital assistant (PDA), a smartphone, or any programmable electronic device capable of communicating with server computer 102 via network 110. Client computer 104 may be a node in a distributed database management environment. In general, client computer 104 can be representative of any computing device or a combination of devices with respective access to facial search application 300, and is capable of executing facial search application 300.

Client computer 104 includes an instance of facial search application 300, which executes locally on client computer 104 and has the capability to access facial recognition system 400, and facial data 106 on server computer 102 via network 110. Facial recognition system 400 enables facial search application 300 on client computer 104 to transmit and store candidate images and associated metadata to facial data 106, or to modify existing candidate images in facial data 106 on server computer 102 via network 110. Facial search application 300 allows authorized users, for example, law enforcement officers, to search for matches of a probe image, such as probe image 200, against a repository of facial image data on a server, such as facial data 106 on server computer 102. Facial search application 300 may calculate biometric measurements of probe image 200 to aid in matching probe image 200 to an image within facial data 106. In another embodiment, facial search application 300 may be an associated client application created by the vendor or developer of facial recognition system 400 for use in a server-client environment. Facial search application 300 may be fully integrated with, partially integrated with, or be completely separate from facial recognition system 400. In the depicted environment, facial search application 300 uses a user interface, such as UI 112, to receive user input, and to output responses to a user. Facial search application 300 is described further in reference to FIG. 3.

Client computer 104 includes a user interface, such as UI 112, which executes locally on the client computer. UI 112 may utilize a web page application, a command line processor, or any other graphical user interface (GUI). UI 112 includes components used to receive input from a user and transmit the input to facial search application 300 residing on client computer 104. In an embodiment, UI 112 uses a combination of technologies and devices, such as device drivers, to provide a platform to enable users of client computer 104 to interact with facial search application 300. In an embodiment, UI 112 receives input, such as dragging and dropping data icons onto a workspace using a physical input device, such as a keyboard or mouse, via a device driver that corresponds to the physical input device.

In various embodiments of the present invention, client device 108 can be a laptop computer, a tablet computer, an application server, a netbook computer, a personal computer (PC), a desktop computer, a personal digital assistant (PDA), or a smartphone capable of communicating with client computer 104 and server computer 102 via network 110. Client device 108 may be completely separate from, partially integrated or fully integrated with a photo scanner, a digital camera, a phone camera, a video camera, a web camera, a surveillance camera, or any electronic device capable of capturing an image of a face and saving the image as a digital file. In general, client device 108 can be representative of any computing device or a combination of devices with respective access to probe image 200 and image capture application 116, and is capable of executing image capture application 116.

Client device 108 includes an instance of image capture application 116. Image capture application 116 enables the capturing, processing and storing of a facial image, such as probe image 200, and provides for transmitting probe image 200 to facial search application 300 on client computer 104 via network 110. Processing may or may not include calculating biometric measurements before transmitting probe image 200 to facial search application 300. In one embodiment, image capture application 116 may be configured to calculate biometric measurements based on face detection, and lens and distance calculations from the photo metadata or the device, and may store the results within the metadata for probe image 200. Image capture application 116 may then transmit probe image 200, associated metadata, and subject personal information to facial recognition system 400 on server computer 102 via network 110 to be included in a database of candidate images, such as facial data 106. In an alternate embodiment, client device 108 may not utilize image capture application 116, and may receive probe image 200 as an image file attached to an email, as a picture message, or from a storage device in communication with client device 108.

Client device 108 includes an instance of probe image 200. Probe image 200 may be an image including, but not limited to, a digital image of a face with associated metadata. The digital image may be including, but not limited to, a scan of an artist sketch, a still from a video image, a scan of a printed photo, and an image from a digital camera or smart phone camera. The metadata may be including, but not limited to, date/timestamp of image capture, focal length of camera, lens and distance calculation results, aperture setting, and resolution. Facial search application 300 on client computer 104 receives probe image 200 as input from client device 108 via network 110. Facial search application 300 may modify the received probe image 200 by adding information including, but not limited to, measurements of facial features within the image and encoded in some form, demographic characteristics, and biometric measurements to be used in pre-filtering. In other embodiments, client device 108 may be connected to client computer 104 locally, such as a scanner or camera connected to a desktop computer.

In other embodiments of the present invention, facial recognition system 400, facial search application 300, and facial data 106 may be on one computer, or more than one computer, and each item itself may be split into a plurality of parts or modules and spread across more than one computer. In any configuration, the following is maintained: facial recognition system 400 and facial search application 300 may communicate with facial data 106, and facial recognition system 400 may communicate with facial search application 300.

Figure 2:
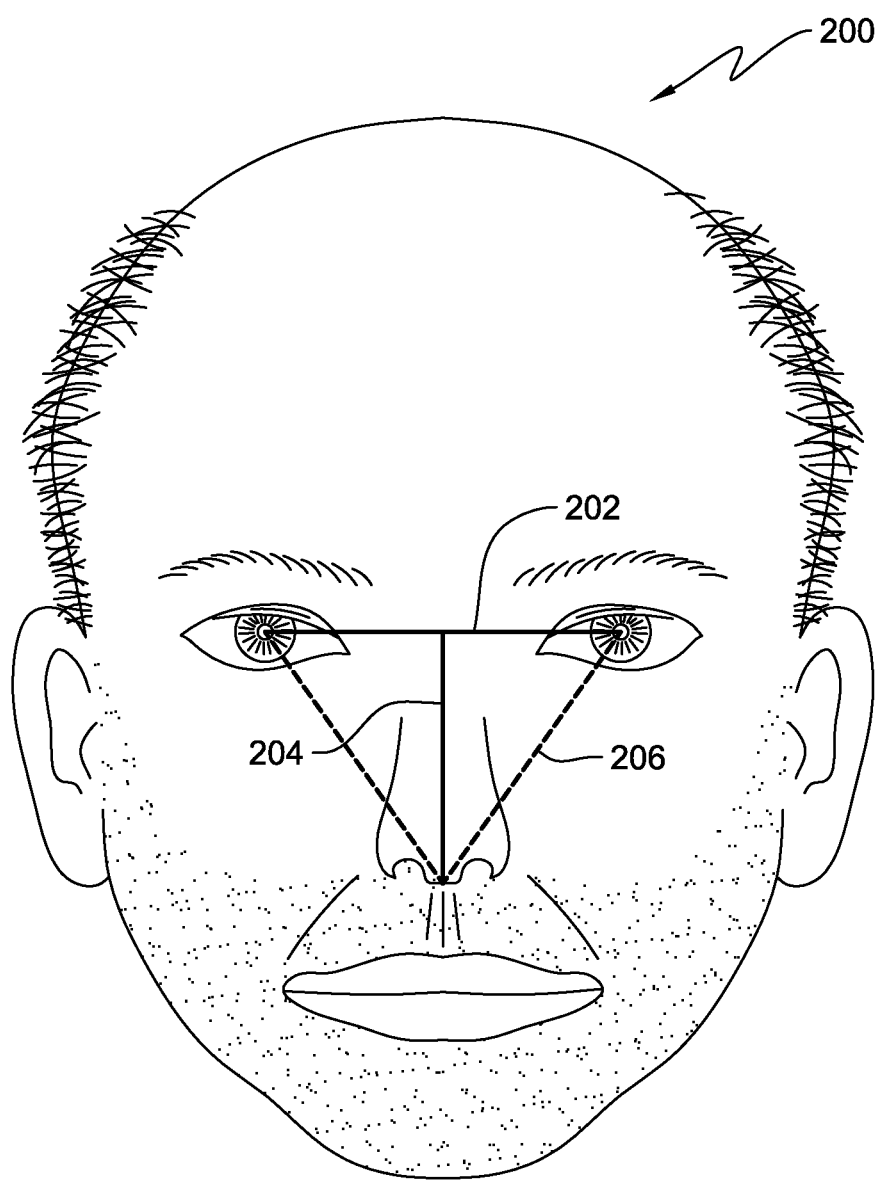
FIG. 2 is an illustration of a probe image used by a facial search application, for the purpose of depicting biometric measurements, in accordance with an embodiment of the present invention.

In the illustrative embodiment of the present invention, facial search application 300 on client computer 104 receives probe image 200 and associated metadata from client device 108 via network 110. For example, a policeman on the street may take a photo of a suspect with image capture application 116 on client device 108, such as a smartphone camera, and transmit the image to a law enforcement user of facial search application 300 back in the office on client computer 104. Facial search application 300 receives probe image 200, and encodes probe image 200 with additional metadata related to measurements of facial features used by the facial recognition algorithm of facial recognition system 400. In embodiments of the present invention, facial search application 300 calculates one or more biometric measurements of probe image 200, such as the eye-to-eye distance, the ratio of eye-to-eye distance over mid-eye to nose-tip distance, or the geometric shape of a triangle between the eyes and the midpoint of the nose. Facial search application 300 stores the results of each of the biometric measurements as individual data fields, separate from the metadata of probe image 200, to be used as pre-filters to reduce the number of candidate images in facial data 106 processed by facial recognition system 400 using facial recognition analysis. One skilled in the art will recognize that many such biometric measurements may be calculated and used as pre-filters during facial recognition. Some biometric measurements are more effective than others at removing or filtering out non-matching images without affecting the quality of the matching results. Selected biometric measurements of probe image 200 are illustrated in FIG. 2.

Facial search application 300 may receive a selection of demographic characteristics related to probe image 200 as input from a user, such as a law enforcement officer. Facial search application 300 determines a range for each biometric measurement to be used as a pre-filter based, at least in part, on the selected demographic characteristics, and on pre-defined defaults. In an alternate embodiment, the range may be determined, in part, by facial recognition system 400, or be based on input from a user of either facial search application 300, or facial recognition system 400.

Facial search application 300 receives a request from the user to perform facial recognition of probe image 200. Facial search application 300 sends the request including probe image 200, metadata, and associated one or more biometric measurements with ranges to facial recognition system 400 on server computer 102 via network 110. Facial recognition system 400 uses the one or more biometric measurements of probe image 200 with the determined one or more ranges to identify a sub-set of facial data 106 comprising candidate images with biometric measurements falling within the one or more biometric measurement ranges. By using pre-filters to reduce the number of candidate images to which probe image 200 is compared, the time facial recognition system 400 and server computer 102 takes to search through facial data 106 is reduced without affecting the quality of matching results.

In an alternate embodiment, additional demographic characteristics, such as scars, tattoos, or hair color may be received from the user, and used as pre-filters to further reduce the sub-set of facial data 106 that will be compared to probe image 200 using the facial recognition algorithm. Each of the demographic characteristics is saved in a separate data field from the biometric measurements, and from the metadata for each candidate image within facial data 106.

FIG. 2 is an illustration of probe image 200 used by facial search application 300, for the purpose of depicting biometric measurements, in accordance with an embodiment of the present invention. Facial search application 300 receives probe image 200 from client device 108 via network 110. Facial search application 300 encodes probe image 200 according to requirements of the facial recognition algorithm used by facial recognition system 400. In various embodiments, facial search application 300 calculates the biometric measurement of eye-to-eye distance 202 in probe image 200, and stores it separately from the encoded metadata for probe image 200. Facial search application 300 defines the biometric measurement of eye-to-eye distance 202 for use as a biometric pre-filter, and saves the measurement as a simple numeric field in a separate column from the encoded data for each candidate image in facial data 106.

Interpupillary distance (IPD), or eye-to-eye distance 202, is measured as the distance between the center of the pupils of the eyes. According to studies, the IPD may range from 50 to 75 mm for adults with a mean IPD of 63 mm. Variations in IPD have been noted from person to person, and people may be categorized based on their IPD. One advantage to this measurement is that the value is a simple numerical value, which is both easy to calculate and easy to use in database searches. In the United States, the typical range of interpupillary distance is between 55 mm and 70 mm (millimeters). Facial search application 300 may initially set the search range for eye-to-eye distance 202 to a default of 8 mm, and may adjust the range based on input from the user regarding additional demographic characteristics, such as height, in probe image 200. The amount of adjustment of the search range may be done manually by entering a numerical value into one or more data fields, or may be done programmatically by encoding adjustments based, at least in part, on received selections for demographic characteristics.

For example, if facial search application 300 calculates eye-to-eye distance 202 of probe image 200 to be 60 mm and the default search range is 8 mm, then the candidate images in facial data 106 will be pre-filtered to remove candidate images with eye-to-eye distance 202 outside the range of 56 mm to 64 mm. The use of eye-to-eye distance 202 with a search range of 8 mm may be estimated to reduce 20% to 50% of the number of candidate images from facial data 106 to which probe image 200 will be compared using facial recognition analysis. A reduction in the number of candidate images processed by the facial recognition algorithm may improve search speed, and reduce consumption of computing resources.

The search range is also dependent on the quality of the candidate images in facial data 106. Image quality related to lighting, and the tilt of a face within a candidate image may affect the ability of facial search application 300 to measure the eye-to-eye distance 202 or mid-eye to nose-tip distance 204. The biometric measurements may vary within each candidate image within facial data 106 based, at least in part, on the distance of the suspect from the camera, and the number of pixels per square inch in the image.

In various embodiments, facial search application 300 calculates the biometric measurement of mid-eye to nose-tip distance 204 and the ratio of eye-to-eye distance 202 to mid-eye to nose-tip distance 204 from probe image 200. Facial search application 300 stores the ratio of eye-to-eye distance 202 to mid-eye to nose-tip distance 204 separately from the encoded data for probe image 200. Facial search application 300 defines the biometric measurement of ratio of eye-to-eye distance 202 to mid-eye to nose-tip distance 204 for use as a biometric pre-filter, and saves the measurement as a simple numeric field in a separate column from the encoded data for each candidate image in facial data 106. Using the ratio instead of a direct measurement between two features eliminates the issues with how the measurements were taken. The correlation between number of pixels in the image and an actual length in mm is no longer needed as the units cancel out.

Facial recognition system 400 compares candidate images with probe image 200 using the ratio of eye-to-eye distance 202 to mid-eye to nose-tip distance 204 based on the calculation: $M = 1 - \text{Abs}(R_C - R_P)$. $R_C$ stands for the ratio of eye-to-eye distance 202 to mid-eye to nose-tip distance 204 in the candidate image within facial data 106. $R_P$ stands for the ratio of eye-to-eye distance 202 to mid-eye to nose-tip distance 204 in probe image 200. M stands for the match value, where the higher the number, the better the match between the candidate image and probe image 200. In the following example, $M = 1 - \text{Abs}(0.75 - 0.70) = 1 - 0.05 = 0.95$, the delta between the ratio of probe image 200 and a candidate image, i.e., $(R_C - R_P)$, increases as the match worsens, thus reducing the match value, M. A threshold for M may be set at 0.81, and may be estimated to reduce 13% of the number of candidate images through pre-filtering of candidate images from facial data 106 to which probe image 200 will be compared using the facial recognition algorithm.

In various embodiments, facial search application 300 calculates the geometric shape of triangle 206, defined by the eyes and the midpoint of the nose, and is used as a biometric pre-filter. Triangle 206 may be used together with, or in place of, the ratio of eye-to-eye distance 202 to mid-eye to nose-tip distance 204 as a biometric pre-filter. Triangle 206 may be saved as a geometric shape data type. When pre-filtering based on triangle 206, facial recognition system 400 uses a geometric shape search of facial data 106 similar to searches used in geospatial information databases. In one embodiment, the match criteria for two geometric shapes may be calculated by subtracting the area of a candidate shape from the area of shape probe image 200 when the candidate shape is overlaid onto probe image 200, dividing the result by the area of probe image 200, and multiplying by 100% to determine a percent difference. Facial search application 300 may initially set the search range for triangle 206 to a default of 10% (percent difference), and may adjust the range based on input from the user regarding the demographic characteristics of the subject in probe image 200. A person of ordinary skill in the art will recognize there are other ways in which geometric or spatial shapes may be compared.

In another embodiment, the match criteria for triangle 206 of probe image 200 compared with the triangle from a candidate image may be based, at least in part, on comparing a length of one or more of the sides of triangle 206. In that case, the search range for triangle 206 may include a range of the length as a numeric value for at least one side of triangle 206. The search range of the length may be adjusted based on the selection of one or more demographic characteristics.

In another embodiment, the match criteria for triangle 206 of probe image 200 compared with the triangle from a candidate image may be based, at least in part, on comparing the area of triangle 206, as a numeric value. The search range of the area may be adjusted based on the selection of one or more demographic characteristics. One skilled in the art will recognize that there are many other metrics, such as interior angles, or ratios of side lengths, that may be used to compare two measured triangular-shaped objects.

In various embodiments, one or more of the biometric measurements of probe image 200 including eye-to-eye distance 202, the ratio of eye-to-eye distance 202 to mid-eye to nose-tip distance 204, or triangle 206 may be used as pre-filters of candidate images within facial data 106 prior to applying a facial recognition algorithm to the remaining set of candidate images.

Figure 3:
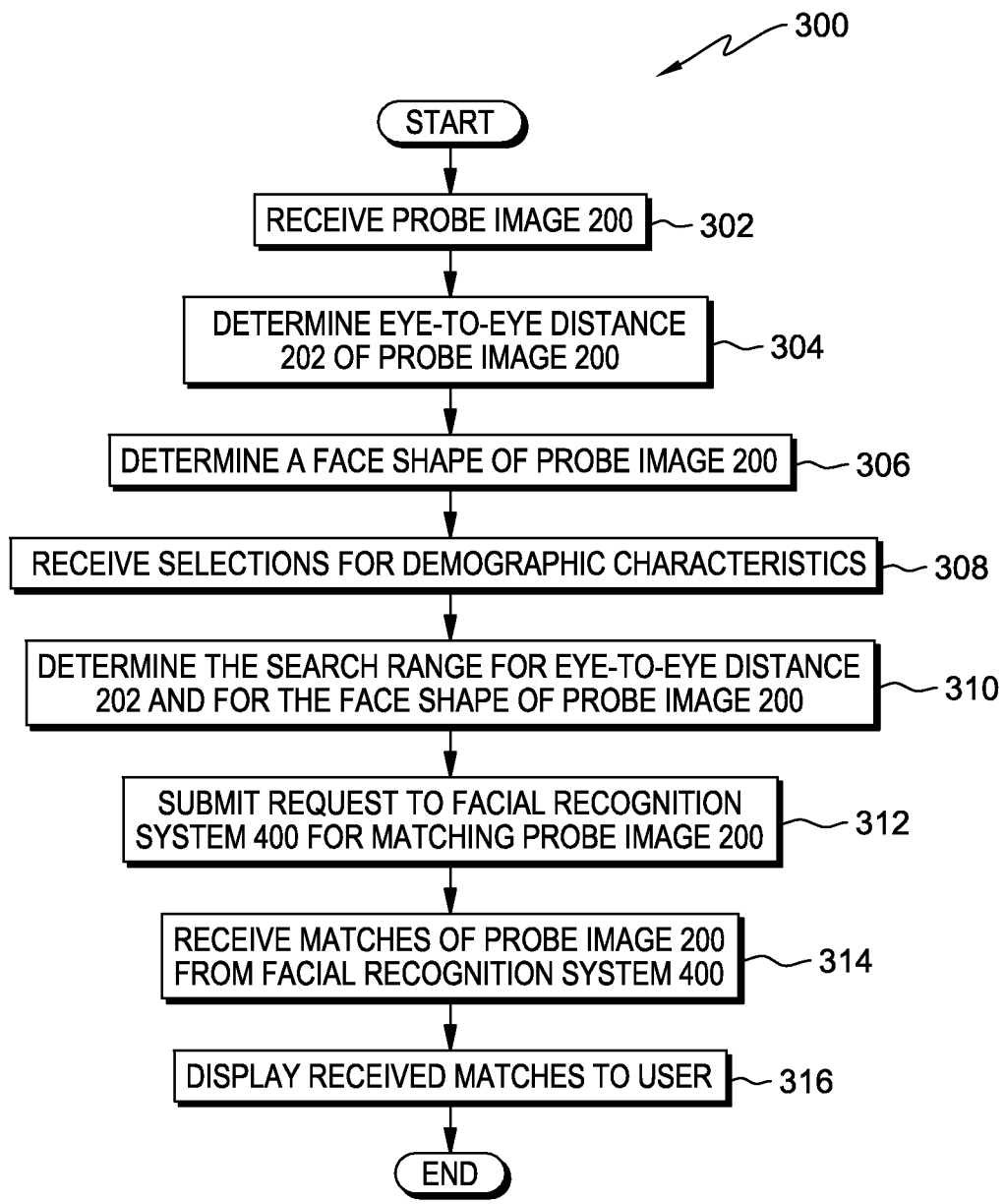
FIG. 3 is a flowchart depicting the operational steps of a facial search application, on a client computer within the distributed data processing environment of FIG. 1, for the purpose of optimizing facial recognition using biometric pre-filters, in accordance with an embodiment of the present invention.

FIG. 3 is a flowchart depicting the operational steps of facial search application 300, on client computer 104 within the distributed data processing environment 100 of FIG. 1, for the purpose of optimizing facial recognition using biometric pre-filters, in accordance with an embodiment of the present invention.

Initially, facial recognition system 400 on server computer 102 receives credentials from a user of server computer 102 or client computer 104 for validation. A person of ordinary skill in the art may recognize that users, such as law enforcement officers, of facial search application 300 on client computer 104 may request validation of credentials before accessing facial data 106 on server computer 102, and making updates to the information stored therein. Responsive to determining that the user has the proper authority, facial recognition system 400 performs the requested tasks. If the user does not have the proper authority, then no access will be granted, and no tasks will be performed.

Facial search application 300 receives probe image 200 (step 302). Facial search application 300 may receive probe image 200 and the associated image metadata over network 110 from image capture application 116 on client device 108, such as a police camera or smartphone camera. Alternately, client device 108 may be connected to client computer 104 locally, such as a connected scanner, or digital camera.

Facial search application 300 determines eye-to-eye distance 202 of probe image 200 (step 304). Facial search application 300 measures eye-to-eye distance 202 in millimeters from the center of the pupil of the first eye to the center of the pupil of the second eye, and may be referred to as interpupillary distance. In some embodiments, facial search application 300 may include tools for recognizing and marking the pupils of the eyes, and the line between them. In other embodiments, facial search application 300 may receive notations on probe image 200 from the user of client computer 104 indicating the line to use for measuring eye-to-eye distance 202. The measurement of eye-to-eye distance 202 may include some inaccuracies due to variables such as the distance of the suspect from the camera, and the tilt of the head away from the plane of the camera lens. Facial search application 300 may use the number of pixels between facial features in the image to enable a calculation, such as eye-to-eye distance 202. A pixel is the smallest portion of a digital image with uniform color. For each image, facial search application 300 may calibrate pixel size by comparing the number of pixels within an object of known length that is visible in the image. The resolution information or scaling data may also be part of the image metadata received with each digital image depending on the configuration of the image file.

Facial search application 300 determines a face shape of probe image 200 (step 306). Initially, facial search application 300 determines mid-eye to nose-tip distance 204 within probe image 200. Facial search application 300 recognizes the mid-eye point as the center point of a line drawn between the two eyes of a face within probe image 200. Facial search application 300 recognizes the nose-tip of probe image 200 as the tip of the nose of the face within probe image 200. Facial search application 300 measures mid-eye to nose-tip distance 204 in millimeters from the mid-eye point to the tip of the nose. In some embodiments, facial search application 300 may include tools for recognizing the mid-eye point and the nose tip, and generating a line that connects the mid-eye point and the nose-tip. In other embodiments, facial search application 300 may receive notations on probe image 200 from the user of client computer 104 indicating the line to use for measuring mid-eye to nose-tip distance 204. The measurement of mid-eye to nose-tip distance 204 may include similar inaccuracies as eye-to-eye distance 202 for the reasons stated above in step 304.

Facial search application 300 determines a face shape of probe image 200 by calculating the ratio of eye-to-eye distance 202 (from step 304) to mid-eye to nose-tip distance 204. While each measurement may include inaccuracies, using the ratio of the two measurements reduces the overall inaccuracy, and enables comparisons with the same ratio pre-calculated and stored in a separate data field for each of the candidate images in facial data 106.

In an alternate embodiment, facial search application 300 determines a face shape of probe image 200 (alternate step 306), such as the geometric shape of triangle 206, defined by the pupils of the eyes and the nose-tip. Triangle 206 may be used in place of the ratio of eye-to-eye distance 202 to mid-eye to nose-tip distance 204 as a biometric pre-filter. In some embodiments, facial search application 300 may include tools for recognizing the triangle shape defined by the pupils of the eyes and the nose-tip. In other embodiments, facial search application 300 may receive notations on probe image 200 from the user of client computer 104 indicating the lines to use for defining triangle 206. Triangle 206 may be saved as a geometric shape data type. When pre-filtering based on triangle 206, facial recognition system 400 uses a geometric shape search of facial data 106 similar to searches used in geospatial information databases.

Facial search application 300 receives selections for demographic characteristics (step 308). Facial search application 300 receives one or more selections of demographic characteristics that are related to probe image 200 as input by a user of client computer 104, such as a law enforcement officer. Prior to this step, facial search application 300 displayed a list of selectable demographic characteristics which the user would select based, at least in part, on details visible in probe image 200, and from information relayed with probe image 200, for example, communication with the law enforcement officer on the street who may have taken probe image 200. Facial search application 300 may display demographic characteristics with a selectable list of options. Facial search application 300 may display the options for a demographic characteristic as selections indicating a range, a selection for a unique characteristic, or display a field for manual entry. For example, age ranges may look like the following: 0-5 years, 6-15 years, 16 to 25 years, 26 to 30 years, 31 to 40 years, 41 to 50 years, over 50 years, etc. In the case of manual entry, facial search application 300 may apply a default search range to the manually entered number for a demographic characteristic, or may receive a manually entered number for the search range from the user of client computer 104.

In an alternate embodiment, additional demographic characteristics, such as scars, tattoos, or hair color may be received as selections from the user in step 308 to be used as additional pre-filters to reduce the sub-set of candidate images in facial data 106 that will be compared to probe image 200 using the facial recognition algorithm. Not all demographic characteristics may be utilized to adjust the search range for the biometric measurements. The demographic characteristic in this case, such as the existence of a scar, does not influence the biometric measurement of the subject, such as eye-to-eye distance 202.

Facial search application 300 determines the search range for eye-to-eye distance 202 and for the face shape of probe image 200 (step 310). Facial search application 300 uses the received selections of demographic characteristics (from step 308), to adjust a default search range for the measurement of eye-to-eye distance 202 and a second default search range for the ratio of eye-to-eye distance 202 to mid-eye to nose-tip distance 204 or triangle 206. As noted earlier in FIG. 2, the mean for eye-to-eye distance 202, varies by demographic characteristics. The default search range for the measurement of eye-to-eye distance 202, the ratio of eye-to-eye distance 202 to mid-eye to nose-tip distance 204, or triangle 206 may be programmed into facial search application 300, or may be specified by the user of client computer 104 using selectable fields, or manually entered data fields.

In an alternate embodiment, facial recognition system 400 determines the default search ranges for the measurement of eye-to-eye distance 202 and the ratio of eye-to-eye distance 202 to mid-eye to nose-tip distance 204 or triangle 206, and determines adjustments to each default search range based on the received selections of demographic characteristics.

In an alternate embodiment, facial search application 300 does not display or receive selections from a user for demographic characteristics. In this case, step 308 is skipped, and in step 310, search ranges for biometric measurements may be set to program defaults, or may be specified by the user of client computer 104 using selectable fields, or manually entered data fields.

Facial search application 300 submits a request to facial recognition system 400 for matching probe image 200 (step 312). Facial search application 300 prepares a request for matching probe image 200 to candidate images in facial data 106 by including probe image 200 with associated metadata (from step 302), and one or more of the following: a measurement for eye-to-eye distance 202 (from step 304), the ratio of eye-to-eye distance 202 to mid-eye to nose-tip distance 204 (from step 306), triangle 206 (from alternate step 306), or selections of demographic pre-filters (from step 308). In some embodiments, the request also includes the default search ranges for the measurement of eye-to-eye distance 202, the ratio of eye-to-eye distance 202 to mid-eye to nose-tip distance 204 or triangle 206, and any determined adjustments to the default search ranges.

Facial search application 300 receives matches of probe image 200 from facial recognition system 400 (step 314). Facial search application 300 receives matches of probe image 200 as a list of one or more candidate images within facial data 106 that meet the criteria passed in the request of step 314, and match above a threshold level defined per the facial recognition algorithm of facial recognition system 400.

Facial search application 300 displays received matches to user (step 316). Facial search application 300 displays the received list of one or more matching candidate images from facial data 106. The candidate images may be ranked by how close probe image 200 matches a candidate image to the matching criteria.

Figure 4:
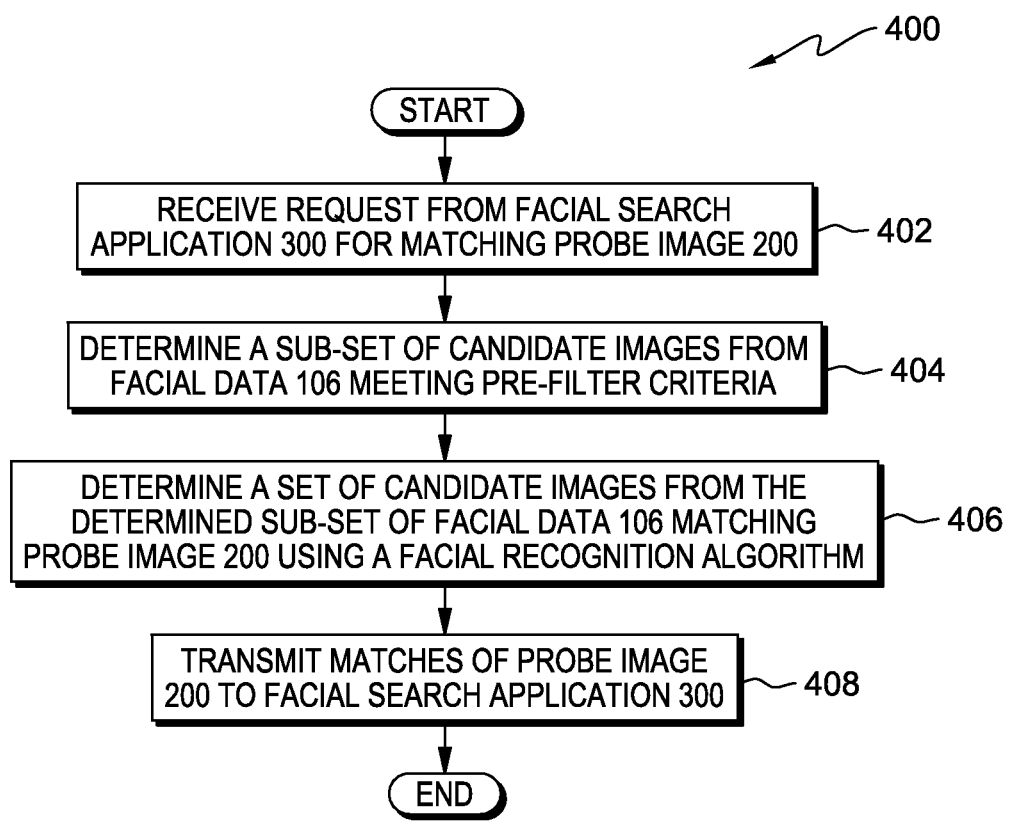
FIG. 4 is a flowchart depicting the operational steps of a facial recognition system, on a server computer within the distributed data processing environment of FIG. 1, for the purpose of optimizing facial recognition using biometric pre-filters, in accordance with an embodiment of the present invention.

FIG. 4 is a flowchart depicting the operational steps of facial recognition system 400, on server computer 102 within the distributed data processing environment 100 of FIG. 1, for the purpose of optimizing facial recognition using biometric pre-filters, in accordance with an embodiment of the present invention.

Facial recognition system 400 receives a request from facial search application 300 for matching probe image 200 (step 402). Facial recognition system 400 receives a request from facial search application 300 on client computer 104 via network 110 to match probe image 200 to candidate images in facial data 106 on server computer 102. The request for matching probe image 200 includes, but is not limited to, probe image 200 with associated metadata, a measurement for eye-to-eye distance 202, the ratio of eye-to-eye distance 202 to mid-eye to nose-tip distance 204 or triangle 206, and selections of demographic characteristics.

Facial recognition system 400 determines a sub-set of candidate images from facial data 106 meeting pre-filter criteria (step 404). Before performing a complex facial recognition algorithm or analysis, facial recognition system 400 creates, and processes a query for retrieving a sub-set of candidate images from facial data 106 which have eye-to-eye distance 202 matching probe image 200 within a determined search range, which have the ratio of eye-to-eye distance 202 to mid-eye to nose-tip distance 204 matching probe image 200 or triangle 206 within a determined search range, and which match the criteria associated with selected demographic characteristics. The query may be broken up into several parts, or may include all criteria at once, based, at least in part, on search engine performance requirements.

Facial recognition system 400 determines a set of candidate images from the determined sub-set of facial data 106 matching probe image 200 using a facial recognition algorithm (step 406). Using a facial recognition algorithm, facial recognition system 400 compares probe image 200 to each of the candidate images within the sub-set of facial data 106 that met the pre-filter criteria (from step 404). Facial recognition algorithms may include, but are not limited to, Principal Component Analysis, Linear Discriminate Analysis, Hidden Markov model, Elastic Bunch Graph Matching, and Neuronal Motivated Dynamic Link Matching. It may be recognized that the facial recognition algorithm is computer processor resource intensive compared to processing the queries of step 404.

Facial recognition system 400 transmits matches of probe image 200 to facial search application 300 (step 408). Facial recognition system 400 transmits matches of probe image 200 as a list of one or more candidate images and associated data within facial data 106 that meet the criteria in the request, and meet criteria defined by the facial recognition algorithm of facial recognition system 400. Each candidate image may be associated with a ranking based, at least in part, on the correlation of the biometric measurements of the candidate image to the biometric measurements of probe image 200.

Figure 5:
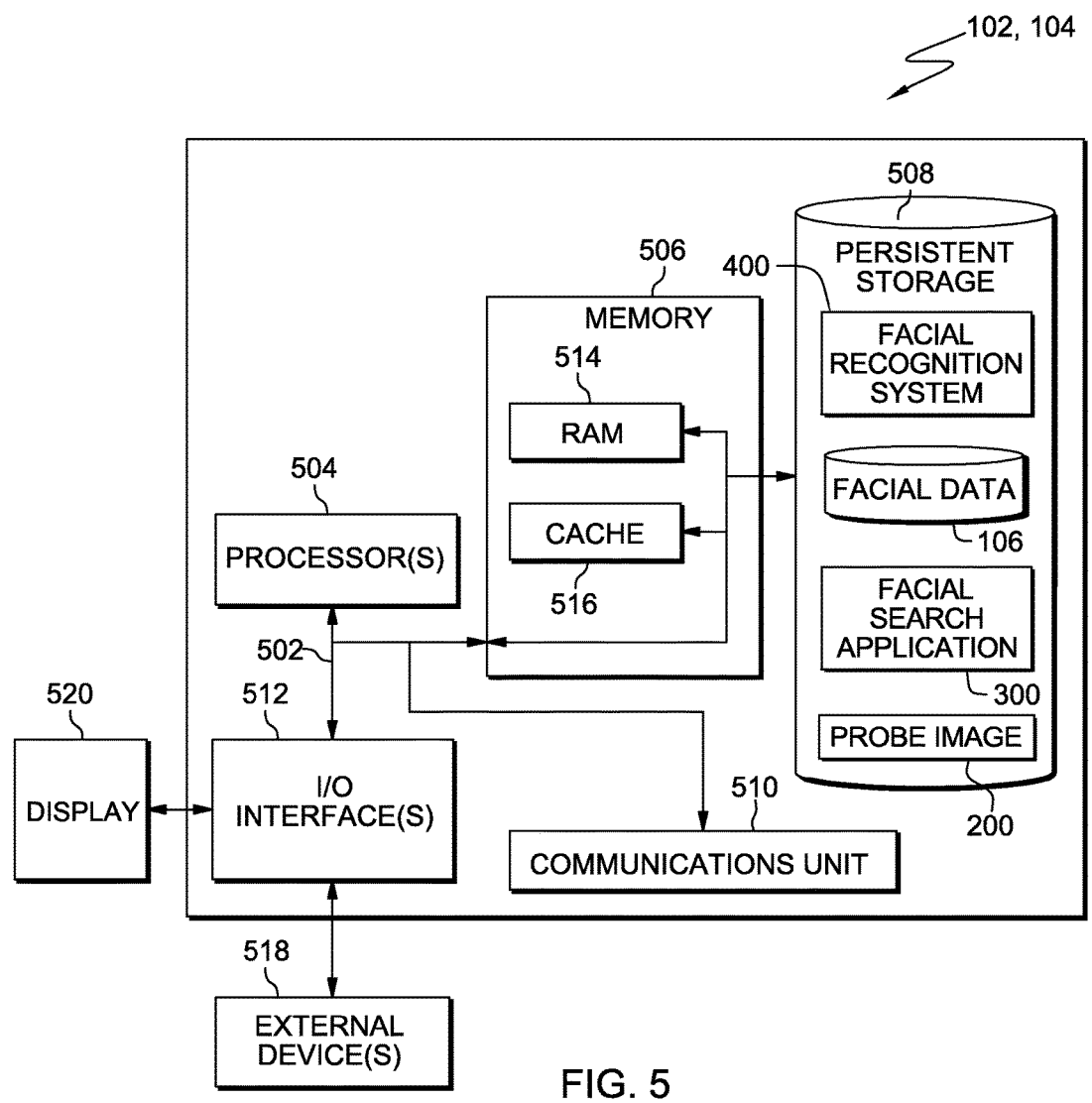
FIG. 5 depicts a block diagram of components of an exemplary computer system for implementing embodiments of the present invention.

FIG. 5 depicts a block diagram of respective components of server computer 102, client computer 104, and client device 108, in accordance with an illustrative embodiment of the present invention. It may be appreciated that FIG. 5 provides only an illustration of one implementation and does not imply any limitations with regard to the environments in which different embodiments may be implemented. Many modifications to the depicted environment may be made.

Server computer 102, client computer 104, and client device 108, may each include respective communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Facial recognition system 400, facial search application 300, and image capture application 116 are stored in respective persistent storage 508 for execution and/or access by one or more of the further respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of server computer 102, client computer 104, and client device 108. In these examples, communications unit 510 includes one or more network interface cards. Communications unit 510 may provide communications through the use of either or both physical and wireless communications links. Facial data 106, facial recognition system 400, facial search application 300, and image capture application 116, may be downloaded to respective persistent storage 508 through communications unit 510.

I/O interface(s) 512 allows for input and output of data with other devices that may be connected to server computer 102, client computer 104, and client device 108. For example, I/O interface 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data used to practice embodiments of the present invention, e.g., facial data 106, facial recognition system 400, facial search application 300, and image capture application 116, can be stored on such portable computer readable storage media and can be loaded onto respective persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for facial recognition processing using biometric pre-filters, the method comprising:

a computer determining (i) a first eye-to-eye distance and (ii) a first mid-eye to nose-tip distance of a first detected face of a first image, wherein the first detected face includes two eyes and a nose, and wherein the first eye-to-eye distance is a biometric measurement taken from a center of a first eye to a center of a second eye of the first detected face;

the computer determining a first ratio, wherein the first ratio is a biometric measurement defined by a ratio of the first eye-to-eye distance to the first mid-eye to nose-tip distance of the first detected face of the first image;

the computer determining a first triangle, wherein the first triangle is a biometric measurement defined by points corresponding to the center of the first eye, the center of the second eye, and a nose-tip of the first detected face of the first image;

the computer receiving a selection of a demographic characteristic;

the computer determining a search range for the first eye-to-eye distance based, at least in part, on the selection of the demographic characteristic, and the first eye-to-eye distance, and wherein the determined search range is a numeric value;

the computer determining a search range for the first triangle based, at least in part, on the selection of the demographic characteristic and the first triangle, and wherein the determined search range includes a range of a length for at least one side of the first triangle;

the computer identifying a second image from a plurality of images, wherein the second image includes a second detected face that includes a second eye-to-eye distance that is included in the determined search range for the first eye-to-eye distance;

the computer determining (i) a second ratio of the second eye-to-eye distance to a second mid-eye to nose-tip distance of the second detected face of the second image from the plurality of images and (ii) a triangle formed by the eyes and nose of the second detected face, wherein the second ratio of the second eye-to-eye distance to the second mid-eye to nose-tip distance is a numeric value;

the computer storing the second ratio of the second eye-to-eye distance to the second mid-eye to nose-tip distance of the second detected face of the second image as a searchable data field; and the computer applying a facial recognition algorithm to the second image to determine at least one potential identity that is associated with the first detected face based, at least in part, on (i) the first ratio of the first eye-to-eye distance to the first mid-eye to nose-tip distance, (ii) the second ratio of the second eye-to-eye distance to the second mid-eye to nose-tip distance, and (iii) at least one side of a triangle with a length that is included in the determined search range for the first triangle.

2. The method of claim 1, further comprising:
the computer determining a search range for the first ratio based, at least in part, on the selection of the demographic characteristic, and the first ratio; and
the computer identifying the second image from a plurality of images, wherein the second image includes the second detected face that includes the second ratio which is based on the second eye-to-eye distance to the second mid-eye to nose-tip distance of the second face, wherein the second ratio is included in the determined search range for the first ratio.

3. The method of claim 1, further comprising:
the computer identifying the second image from a plurality of images, wherein the second image includes the second detected face that includes a second triangle that has at least one side with the length that is included in the determined search range for the first triangle.

4. The method of claim 3, further comprising:
the computer determining the second triangle of the second detected face of the second image from the plurality of images, wherein the second triangle is a biometric measurement defined by points corresponding to respective centers of the eyes of the second detected face and a nose-tip of the second detected face; and
the computer storing the second triangle of the second detected face of the second image as a searchable data field.

5. The method of claim 1, further comprising:
the computer determining the second eye-to-eye distance of the second detected face of the second image from the plurality of images, wherein the second eye-to-eye distance is a numeric value; and
the computer storing the second eye-to-eye distance of the second detected face of the second image as a searchable data field.

6. The method of claim 1, wherein the computer identifying the second image from a plurality of images further comprises using at least two biometric measurements.

* * * * *